(12) United States Patent
Shacham et al.

(10) Patent No.: US 8,340,517 B2
(45) Date of Patent: Dec. 25, 2012

(54) SYSTEMS AND METHODS FOR ON-CHIP DATA COMMUNICATION

(75) Inventors: Assaf Shacham, Magshimim (IL);
Keren Bergman, Princeton, NJ (US);
Luca P. Carloni, New York, NY (US)

(73) Assignee: The Trustees of Columbia University in the City of New York

( * ) Notice: Subject to any disclaimer, the term of this patent is extended or adjusted under 35 U.S.C. 154(b) by 356 days.

(21) Appl. No.: 12/516,131

(22) PCT Filed: Dec. 21, 2007

(86) PCT No.: PCT/US2007/088698
§ 371 (c)(1),
(2), (4) Date: Apr. 20, 2010

(87) PCT Pub. No.: WO2008/080122
PCT Pub. Date: Jul. 3, 2008

(65) Prior Publication Data
US 2011/0103799 A1      May 5, 2011

Related U.S. Application Data

(60) Provisional application No. 60/871,678, filed on Dec. 21, 2007, provisional application No. 60/912,048, filed on Apr. 16, 2007, provisional application No. 60/986,125, filed on Nov. 7, 2007.

(51) Int. Cl.
*H04B 10/00*     (2006.01)
*H04J 14/00*     (2006.01)

(52) U.S. Cl. ............... 398/46; 398/49; 398/50; 398/164

(58) Field of Classification Search .................... 398/45, 398/46, 48–50, 164
See application file for complete search history.

(56) References Cited

U.S. PATENT DOCUMENTS
| | | |
|---|---|---|
| 4,775,216 A | 10/1988 | Layton |
| 5,032,010 A | 7/1991 | Su |
| 5,191,626 A | 3/1993 | Stern |

(Continued)

FOREIGN PATENT DOCUMENTS
EP      1 351 458      10/2003

OTHER PUBLICATIONS

Heirman et al., Speeding up multiprocessor machines with reconfigurable optical interconnects. In Proc. SPIE vol. 6124, optoelectronic Integrated Circuits X, Jan. 2006 [online], tetrieved from the Internet: <http://eschar.elis.ugent.be/publ/Edocs/DOC/P106_036.pdf>.

(Continued)

*Primary Examiner* — Dalzid Singh
(74) *Attorney, Agent, or Firm* — Baker Botts, L.L.P.

(57) ABSTRACT

An on-chip data communications infrastructure includes a hybrid, photonic/electronic network. The network includes a plurality of interconnected optical switches, each under the control of an electronic router. The electronic routers are connected in a fashion similar to the optical switches, forming a parallel, photonic/electronic network. Electronic path setup messages are routed through the electronic network. At each hop, a photonic switching element in a parallel, photonic network is reserved. When the electronic path setup message reaches its destination, a chain of reserved optical switches is ready to channel the optical data through the photonic network.

13 Claims, 15 Drawing Sheets

U.S. PATENT DOCUMENTS

| | | | |
|---|---|---|---|
| 5,287,316 | A | 2/1994 | Urushidani et al. |
| 5,463,486 | A | 10/1995 | Stevens |
| 5,912,753 | A | 6/1999 | Cotter et al. |
| 6,125,112 | A | 9/2000 | Koning et al. |
| 6,268,952 | B1 | 7/2001 | Godil et al. |
| 6,385,364 | B1 * | 5/2002 | Abushagur ............... 385/16 |
| 6,609,840 | B2 | 8/2003 | Chow et al. |
| 6,740,864 | B1 * | 5/2004 | Dries ............... 250/227.11 |
| 6,778,536 | B1 | 8/2004 | Ofek et al. |
| 6,810,211 | B1 | 10/2004 | Castanon |
| 6,845,184 | B1 * | 1/2005 | Yoshimura et al. ........ 385/14 |
| 6,904,239 | B2 | 6/2005 | Chow et al. |
| 6,957,018 | B2 | 10/2005 | Araki et al. |
| 7,024,114 | B2 | 4/2006 | Dotaro et al. |
| 7,079,532 | B2 | 7/2006 | Li |
| 7,317,873 | B2 | 1/2008 | Aoki |
| 7,433,931 | B2 * | 10/2008 | Richoux ............... 709/217 |
| 7,522,836 | B2 | 4/2009 | Islam |
| 7,650,081 | B2 | 1/2010 | Jennen et al. |
| 7,840,323 | B2 | 11/2010 | Bour et al. |
| 2002/0018263 | A1 | 2/2002 | Ge et al. |
| 2003/0128980 | A1 * | 7/2003 | Abeles ............... 398/48 |
| 2003/0133641 | A1 | 7/2003 | Yoo |
| 2004/0213570 | A1 | 10/2004 | Wai et al. |
| 2004/0220886 | A1 | 11/2004 | Kumaran et al. |
| 2004/0258348 | A1 | 12/2004 | Deliwala |
| 2005/0063701 | A1 | 3/2005 | Ovadia et al. |
| 2005/0078666 | A1 | 4/2005 | Beshai |
| 2005/0078902 | A1 | 4/2005 | Beausoleil et al. |
| 2005/0111777 | A1 | 5/2005 | Stenger et al. |
| 2006/0285567 | A1 | 12/2006 | Otoma |

OTHER PUBLICATIONS

Heirman et al., Reconfigurable Optical Networks for On-Chip Multiprocessors, Proceedings of the Special Workshop on Future Interconnects and Networks on a Chip, Mar. 10, 2006 [online], retrieved from the Internet: <http://archive.ugent.be/retrieve/5767/P106_027.pdf>.

Chen et al., On-Chip Copper-Based vs. Optical Interconnects: Delay Uncertainty, Latency, Power, and Bandwidth Density Comparative Predictions, Jun. 2006 [online], retrieved from the Internet: <http://www.ece.rochester.edu/users/friedman/papers/IIT_06.pdf>.

Chamberlain et al., Gemini: An Optical Interconnection Network for Parallel Processing, *IEEE Transactions on Parallel and Distributed Systems*, 13(10): 1038-1055, Oct. 2002.

U.S. Appl. No. 12/054,111, filed Mar. 24, 2008.
U.S. Appl. No. 12/113,554, filed May 1, 2008.
U.S. Appl. No. 12/438,661, Nov. 15, 2010.
U.S. Appl. No. 12/054,111, filed Feb. 23, 2012, Final Office Action.
U.S. Appl. No. 12/054,111, filed Dec. 16, 2011 Response to Nin-Final Office Action.
U.S. Appl. No. 12/054,111, filed Aug. 19, 2011 Non-Final Office Action.
U.S. Appl. No. 12/054,111, filed May 20, 2011 Response to Non-Final Office Action.
U.S. Appl. No. 12/054,111, filed Dec. 21, 2010 Non-Final Office Action.
U.S. Appl. No. 12/113,554, filed Feb. 13, 2012 Response to Non-Final Office Action.
U.S. Appl. No. 12/113,554, filed Oct. 14, 2011 Non-Final Office Action.
U.S. Appl. No. 12/113,554, filed Jun. 16, 2011 Response to Non-Final Office Action.
U.S. Appl. No. 12/113,554, filed Mar. 21, 2011 Non-Final Office Action.

Bauknecht et al., "12Gbit/s laser diode and optical modulator drivers with InP/InGaAs double HBTs", *Electronics Letters*, Nov. 7, 1996; 32(23): 2156-2157.

Dorgeuille et al., "Fast optical amplifier gate array for WDM routing and switching applications", *OFC '98 Technical Digest*, Tuesday Afternoon, 1998: 42-44.

Guillemot et al., "Transparent optical packet switching: The European ACTS KEOPS project approach", *Journal of Lightwave Technology*, Dec. 1998; 15(12): 2117-2134.

Krishnamoorthy et al., "Triggered receivers for optoelectronic VLSI", *Electronic Letters*, Feb. 3, 2000; 36(3): 249-250.

Mokhtari et al., "Bit-rate transparent electronic data regeneration in repeaters for high speed lightwave communication systems", *Circuits and Systems, 1999. Proceedings of the 1999 IEEE International Symposium on Circuits and Systems*, 1999: 508-511.

Sacham et al., "A Fully Implemented 12X12 Data vortex Optical Packet Swwitching Interconnection Network". *Journal of Lightwave Technology*, 23(10): 3066-3075 (2005).

Sahri et al., "A highly integrated 32-SOA gates optoelectronic module suitable for IP multi-terabit optical packet routers", *Optical Fiber Communication Conference and Exhibit*, 2001; vol. 4: PD32-1-PD32-3.

Schneibel et al., "High current InP double hetero bipolar transistor driver circuit for laser diodes", *11th International Conference on Indium Phosphide and Related Materials*, May 1999: 455-457.

Venditti et al., "Design and test of an optoelectronic-VLSI chip with 540-element receiver-transmitter arrays using differential optical signaling", *IEEE Journal of Selected Topics in Quantum Electronics*, Mar./Apr. 2003; 9(2): 361-379.

U.S. Appl. No. 12/054,111, filed Jun. 22, 2012 Amendment and Request for Continued Examination (RCE).
U.S. Appl. No. 12/438,661, Jul. 26, 2012 Non-Final Office Action.
U.S. Appl. No. 12/113,554, Aug. 3, 2012 Notice of Allowance.

* cited by examiner

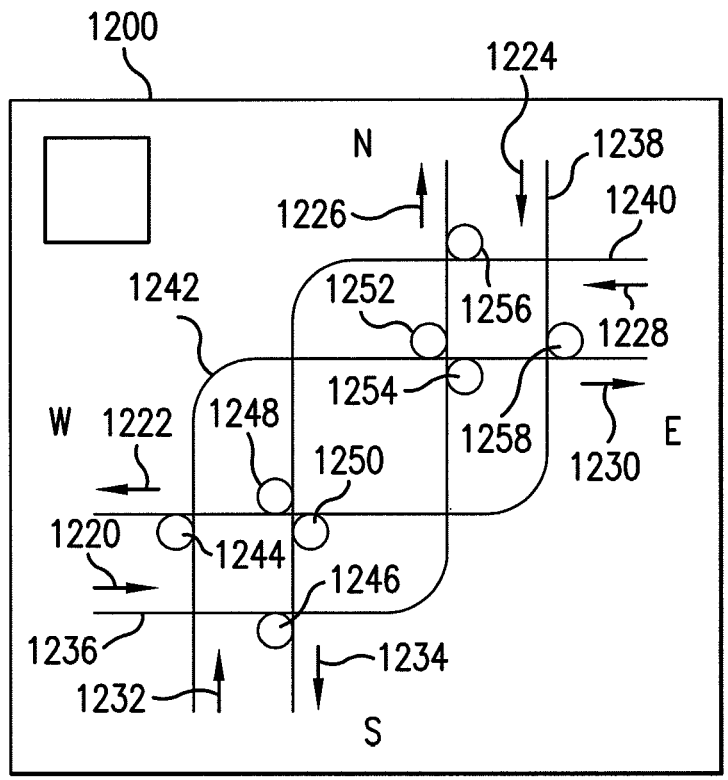
FIG.12A
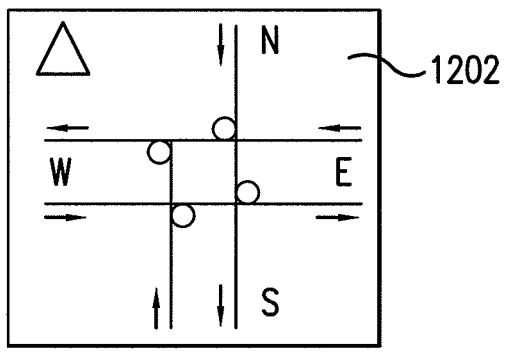
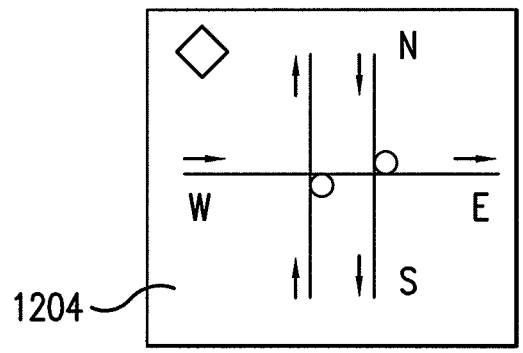
FIG.12B  FIG.12C

SYSTEMS AND METHODS FOR ON-CHIP DATA COMMUNICATION

CROSS REFERENCE TO RELATED APPLICATIONS

This application is a National Phase of International Application PCT/US07/88698, entitled "Systems And Methods For On-Chip Data Communication" and filed Dec. 21, 2007, which claims priority to U.S. Provisional Applications Nos. 60/871,678, entitled "Photonic Network On A Chip" and filed Dec. 22, 2006, 60/912,048, entitled "A Photonic Network On A Chip" and filed Apr. 16, 2007, and 60/986,125, entitled "A Photonic Network On A Chip" and filed Nov. 7, 2007, all of which are incorporated by reference herein.

STATEMENT REGARDING FEDERALLY SPONSORED RESEARCH

This invention was made with government support under grant number NSF 0523771 awarded by the National Science Foundation and DOD/NSA H98230-05-C-0486. The government has certain rights in the invention.

BACKGROUND

To achieve greater gains in processing power while lowering power requirements and costs, processor manufacturers have begun moving away from single core processors toward multicore processors. Processors with 2, 4, 8, and more cores have been realized. Performance gains will continue to come from even greater increases in the number of processor cores per chip.

As a result, the architecture of multicore processors has begun to mimic that of multiprocessor devices, leading to a significant bottleneck, namely the intrachip, global communications infrastructure. The challenge is to increase power efficiency while satisfying the substantial bandwidth capacities and stringent latency requirements for on-chip communications when interconnecting a large number of processing cores.

Recent research has focused on intrachip, global communication using electrical, packet-switched micro-networks. These networks-on-chip (NoC) represent a shared medium that is scalable and can provide enough bandwidth to replace many traditional bus-based and/or point-to-point links. However, with a fixed upper limit to the total chip power dissipation, and the communications infrastructure emerging as a major power consuming bottleneck, performance-per-watt is becoming an important design metric for the scaling of NoCs and core multi-processors (CMPs). Accordingly, a need exists for a low-powered, on-chip data communications infrastructure.

SUMMARY

Systems and methods for on-chip data communications are described.

An exemplary embodiment of the described subject matter includes a device for on-chip data communication including a network of one or more interconnected optical switches, each optical switch including at least one photonic switching component, the at least one photonic switching component adapted to direct optical data through the optical switch when activated, and an electronic router adapted for routing electronic path setup messages from a source to a destination and for activating the at least one photonic switching component; a first photonic network interface for converting electronic data to optical data; and a second photonic network interface for converting optical data to electronic data. The data source and data destination can be core processors on a multicore processor chip. The optical switch can include four photonic switching components arranged in a 2×2 structure. The at least one photonic switching component can include 2 input and 2 output ports. The photonic switching component can include at least one electrically activated ring resonator. In some embodiments, the optical network is arranged in a folded torus topology. The one or more optical switches can be non-blocking.

An exemplary embodiment of the described subject matter includes procedures for on-chip communication including converting electronic data into optical data, routing an electronic path setup message through one or more optical switches, reserving an optical data communication path by, at the one or more optical switches, activating a photonic switching component, the photonic switching component directing the optical data along the optical data communication path; sending the optical data along the optical data communication path; and converting the optical data into electronic data. The on-chip communication can support communications between core processors in a multicore processor architecture. The optical switch can include four photonic switching components. The at least one photonic switching component can include 2 input and 2 output ports. The photonic switching component can include at least one electrically activated ring resonator. The optical network can be arranged in a folded torus topology.

An exemplary embodiment of the described subject matter includes a device for on-chip data communication including a network of interconnected optical switches, a network of interconnected electrical nodes arranged in the same topology as the network of optical switches, the electrical nodes adapted for routing an electronic path setup message from a source to a destination and controlling the optical switches to transmit optical data along an optical data communications path.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the described subject matter and its advantages, reference is now made to the following description, taken in conjunction with the accompanying drawings, in which:

FIG. 12 depicts an exemplary layout of the photonic components for exemplary (12*a*) routing, (12*b*) injection, and (12*c*) ejection switches of the described subject matter. The shapes in the upper left corner of each figure signify the role of the switch in the layout of FIG. 13.

DETAILED DESCRIPTION

Figure 1:
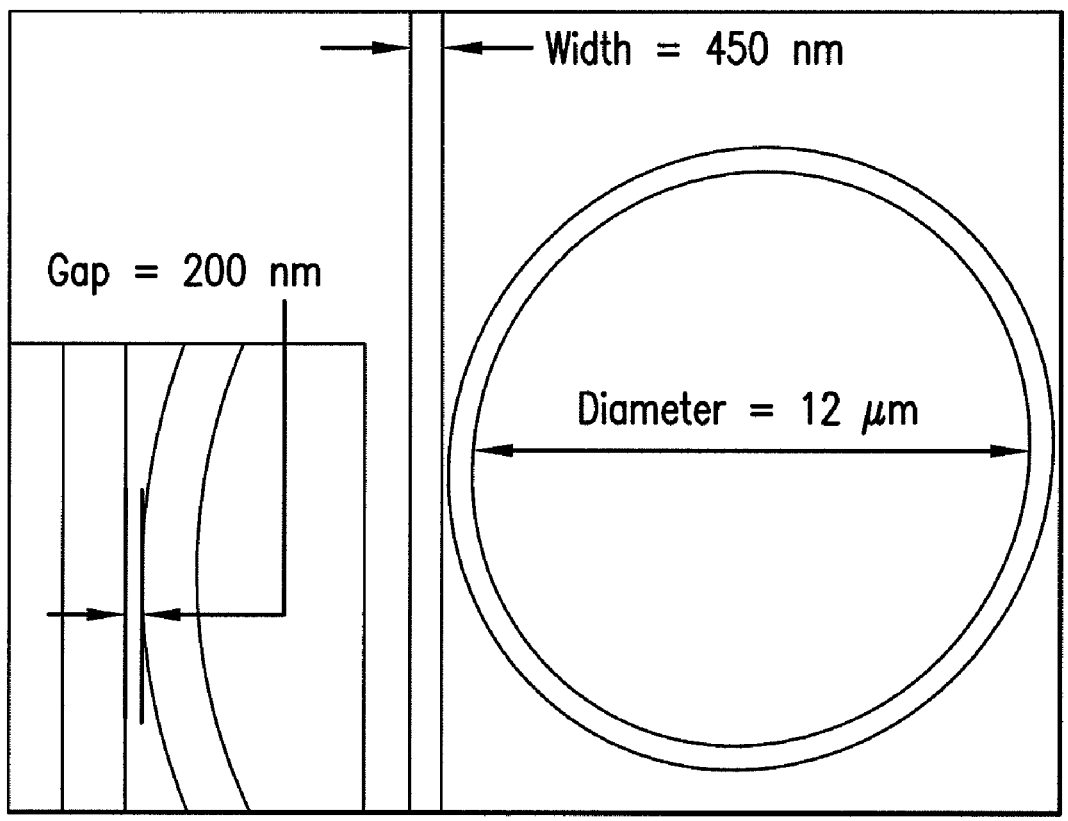
FIG. 1 depicts an exemplary silicon ring resonator of the described subject matter.

In order to at least meet the needs described above, an exemplary on-chip data communication infrastructure employing a hybrid optical/electrical data network is described. In one embodiment, the optical network includes a plurality of interconnected optical switches. Each optical switch includes one or more photonic switching elements. Each optical switch is under the control of a corresponding electronic router. The electronic routers are adapted for switching the photonic switching elements from one state to another, thereby directing light through the optical switch as desired. The electronic nodes are arranged in an interconnected topology similar to that of the optical switches. An electronic path setup message is routed from a source to a destination through the electronic network. At each hop along the path from the source to the destination, the corresponding electronic router routes the electronic path setup message to the next optical switch and configures the corresponding photonic switching elements to direct light to the next optical switch accordingly. As a result, an optical path (chain of optical switches) is constructed as the electronic path setup message is routed to the destination. Once the path is constructed, data is converted from the electronic domain to the optical domain, sent along the optical path through the optical switches, and converted from the optical domain to the electronic domain at the destination.

Photonic interconnection networks are well suited to bulk data transfer. They offer low power dissipation that remains independent of bandwidth capacity (bit rate transparency) while providing ultra-high throughputs and minimal access latencies. In this way, photonic networks can be scaled to meet the growing demands for high bandwidth, on-chip communications, such as communications between multiple cores. These networks realize power savings by transmitting data end to end without the need for repeating, regeneration or buffering once the optical path is set up. In electronic NoCs, on the other hand, messages are buffered, regenerated and then transmitted on the inter-router links several times en route to their destination. In each buffer, regeneration and retransmission operations consume additional power, contributing to the increased power dissipation in electronic networks. A comparison of power consumption in a photonic NoC and an electronic NoC, each designed to provide the same bandwidth to the same number of cores, demonstrates that the power expended on intrachip communications is two orders of magnitude less in optical networks. Moreover, the photonic network can be expanded to achieve even greater throughput performance (e.g., by adding parallel communication links or additional optical switches) without requiring additional power, as the consumed power scales with the length of the optical path, not with the number of parallel optical links.

In general, the architecture of the described subject matter exhibits some similarity with circuit switched networks. In both networks, an electronic path setup message is forwarded along at least one hop to a destination node, incurring latency at each hop. Contention resolution further contributes to the overall latency. Once the path is set up, data can be transmitted at the group velocity of light in a waveguide, approximately $6.6 \times 10^7$ m/s.

Turning to an exemplary embodiment, the optical NoC building blocks (optical switches) are constructed from photonic integrated circuits (PICs) that employ optical microcavities, for example, those based on ring resonator structures shaped from photonic waveguides, which are well known in the art. These structures can be fabricated on conventional silicon and silicon-on-insulator (SOI) substrates with relative ease. This class of small footprint PICs supports high bandwidths that consume less power and introduce lower latency than their electronic counterparts. Compatibility with existing CMOS fabrication systems and the juxtaposition with silicon electronics enable direct driving, controllability, and the integration of these optical networks with processor cores and other silicon-based systems. On-chip photonic NoCs exploit some of the desirable characteristics of large bandwidth, low latency, and low energy consumption that have made photonics well suited in long-haul transmission systems.

Figure 3:
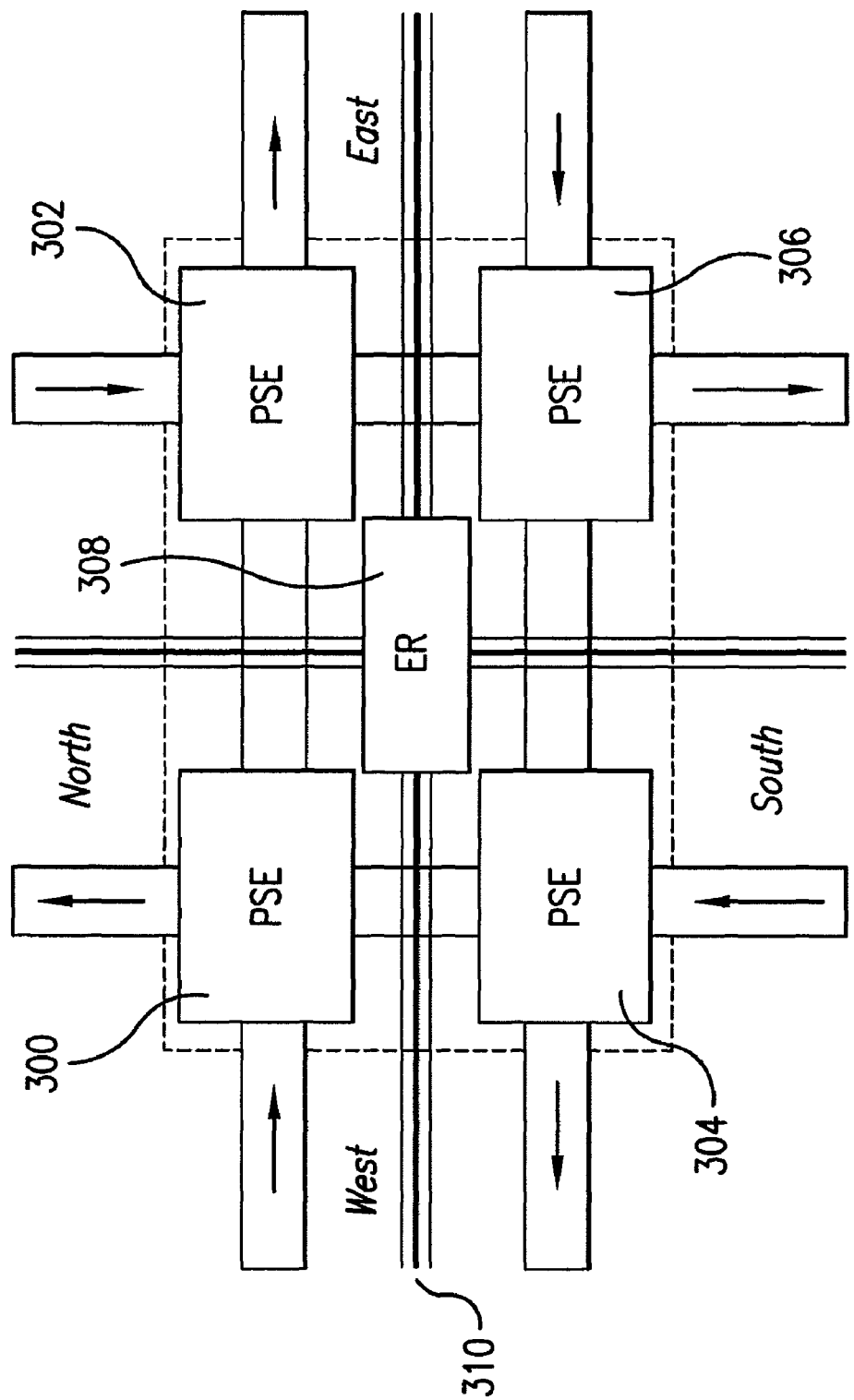
FIG. 3 depicts an exemplary 4×4 optical switch of the described subject matter.

As shown in FIG. 3, an exemplary photonic network includes interconnected optical switches, each switch including four photonic switching elements (PSEs) 300-306 arranged in a 2×2 configuration. Each group of PSEs is controlled by an electronic router 308. In some embodiments, alternative configurations of optical switches can be used, such as a 6×6, 8×8, 6×8, or 8×6 structure, or any combination and arrangement of appropriate PSEs. In some embodiments, more than one electronic router can be used for a single optical switch, for example, to increase the throughput of the electronic network layer or to facilitate parallel optical networks implemented on a single layer of PSEs. In other embodiments, more than one optical switch can share a single electronic router.

Figure 2A:
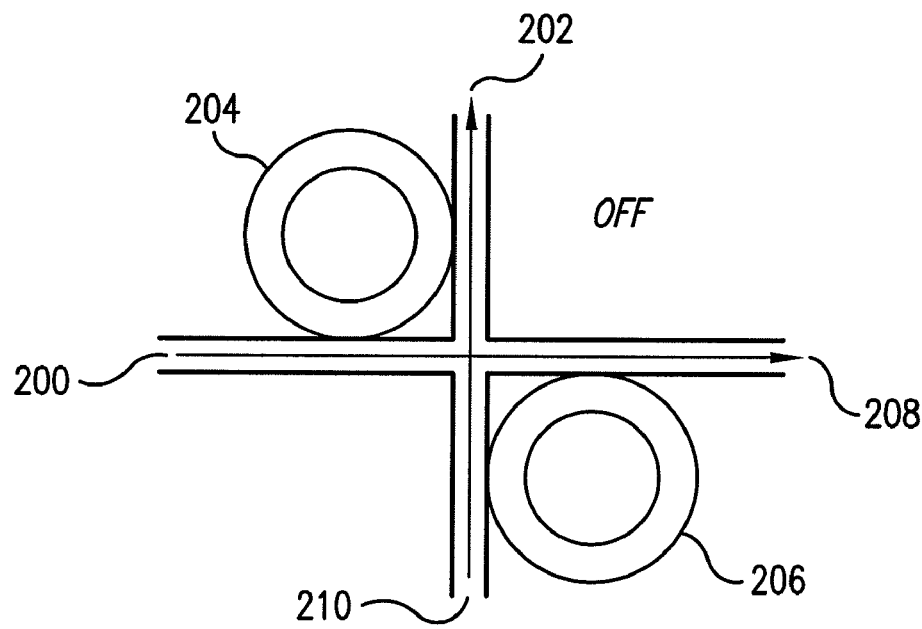
FIGS. 2*a* and 2*b* depict exemplary photonic switching elements of the described subject matter.
Figure 2B:
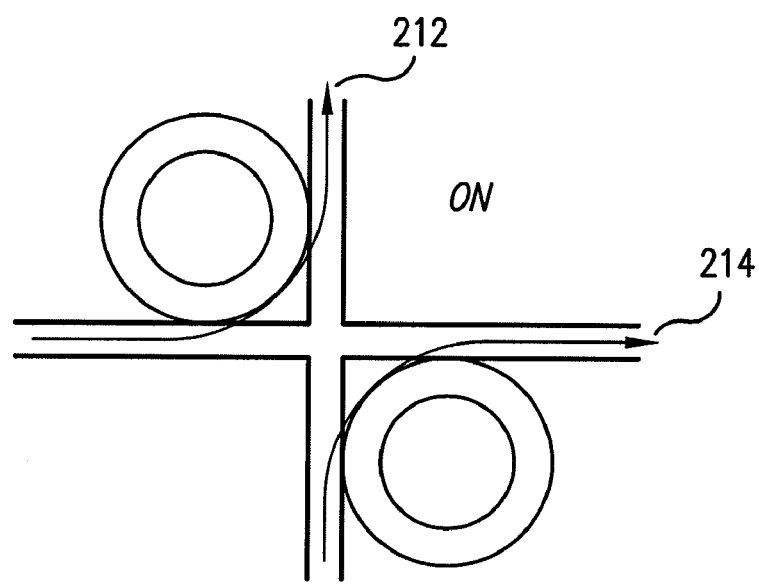

FIGS. 2a and 2b depict exemplary photonic switching elements with waveguides 200 and 202 and ring resonators 204 and 206. In the "OFF" state, (as shown in FIG. 2a) light is allowed to pass through the PSEs without being redirected, as shown in light paths 208 and 210. Ring resonators 204 and 206, when in the "ON" state (as shown in FIG. 2b), redirect light, as shown in light paths 212 and 214.

In this embodiment, a PSE is based on a ring-resonator structure. For example, the structure of the PSE can be a waveguide intersection, positioned between two ring resonators as shown in FIGS. 2a and 2b. The rings have a certain resonance frequency, derived from material and structural properties. In the "OFF" state, when the resonance frequency of the rings is different from the wavelength (or wavelengths) on which the optical data stream is modulated, the light passes through the waveguide intersection uninterrupted, as if it is a passive waveguide crossover (FIG. 2a). When the switch is turned "ON" or "activated", by, for example, the injection of electrical current into p-n contacts surrounding the rings, the resonance of the rings shifts such that the transmitted light, now in resonance, is coupled into the rings making a right angle turn (FIG. 2b), thus creating a switching action. In other embodiments, a PSE can be constructed from deflection switches using the plasma dispersion effect in silicon. It is contemplated that any appropriate photonic switching technology can be used; the foregoing description is for illustrative purposes only.

The PSEs are interconnected by silicon waveguides, carrying the photonic signals, and are organized in groups of four (see PSEs 300-306 in FIG. 3). Each quadruplet, controlled by an electronic circuit, or router 308, forms a 4×4 switch. The 4×4 switches are interconnected by the inter-PSE waveguides to form a photonic network. The electronic routers are interconnected by metal lines to form an electronic network. In some embodiments, the electronic and photonic networks are parallel—that is, any two optical switches whose PSEs are connected by an optical waveguide also include metal lines connecting their electronic routers.

Data packets (e.g., path setup messages) are received in the electronic router, processed and sent to their next hop, while the PSEs are switched ON and OFF accordingly. Once a packet completes its journey through a sequence of electronic routers, a chain of PSEs is ready to route an optical message. Owing to the small footprint of the PSEs and the simplicity of the electronic router, which handles small control packets, the 4×4 switch can occupy a small area. For the foregoing embodiments, based on the size of the microring resonator devices and the minimal logic needed to implement the electronic router, the estimated area is 70 pm×70 μm. In some embodiments, the electronic routers are configured to route traffic other than path setup messages, for example, small messages such as memory read requests or cache snoop messages. Bulk data transfers are routed on the photonic network. The specific implementation of electronic router logic depends on the requirements of the specific implementation of the described subject matter.

Each electronic router includes a logic circuit, memory, and facilities to interact with the individual PSEs. The logic circuit is configured to at least route electronic data (e.g., electronic packet setup messages) through the network. For example, the logic circuit can be programmed to execute a routing algorithm such as the XY dimension-order routing algorithm described below or any appropriate routing algorithm. The memory is configured to buffer electronic data, such as to assist in contention resolution. In conjunction with routing electronic packets to the next optical switch, the electronic router activates one or more PSEs to direct the optical packet to that optical switch. Any appropriate technique for activating a PSE can be used. In one embodiment, the PSE includes a P/N junction. When the electronic router applies a current across the junction, the resonance frequency of the ring resonator is changed. Consequently, light is able to pass through the resonator and is directed along a waveguide to the next optical switch. In other embodiments, light is prevented from entering a ring resonator by shining a light with a wavelength which is a multiple of the ring resonator's circumference into the ring resonator. Light is directed into the ring resonator by shining light with a slightly different wavelength into the ring resonator. Consequently, the second wavelength changes the ring resonator's index of refraction, thereby blocking the first beam. This permits the optical message to enter the ring and to be switched to the next optical switch.

In other embodiments, PSEs can be constructed in alternative arrangements, such as 3×2, 3×3, 4×3 structures, etc.

In some embodiments, the PSEs are adapted for switching wavelength parallel messages (i.e., each message is simultaneously encoded on several wavelengths) as a single unit. In other embodiments, the PSEs switch messages encoded on a single wavelength. The throughput of the network can be increased. For example, switching elements adapted for independently switching multiple wavelengths can be constructed. Messages can be encoded in different wavelengths, and the PSEs can be configured as a single wave-band. In addition, wavelength independent PSEs can be used to form parallel networks that can increase the throughput without the need to provision additional PSEs.

As seen in FIG. 3, the 4×4 switch is blocking. For example, a message routed from South to East will block message requests from West to South and from East to North. In general, messages that make a wide turn (i.e., a turn involving 3 PSEs) potentially block two other message requests that attempt to make wide turns. Messages that make narrow turns (e.g., South to West) and messages that are routed straight through do not block other messages and cannot be blocked. To limit the blocking problem, U-turns within the switches can be prohibited. The blocking relationships between messages are summarized in Table 1.

TABLE 1

| Inter-Message Blocking Relationships | | |
|---|---|---|
| Current message | Blocked message I | Blocked message II |
| North→West | East→North | West→South |
| West→South | North→West | South→East |
| East→North | South→East | North→West |
| South→East | West→South | East→North |

In other embodiments, various PSE grouping schemes can be used, for example, where the directions of the waveguides are flipped, causing the blocking properties to slightly change. In one scheme, the PSEs are grouped as a mirror-image of the current grouping scheme, where the directions of all waveguides are flipped. In another scheme, the direction of only one pair of waveguides is flipped (either the vertical or the horizontal). In this case each turning message potentially blocks one other message.

Figure 6:
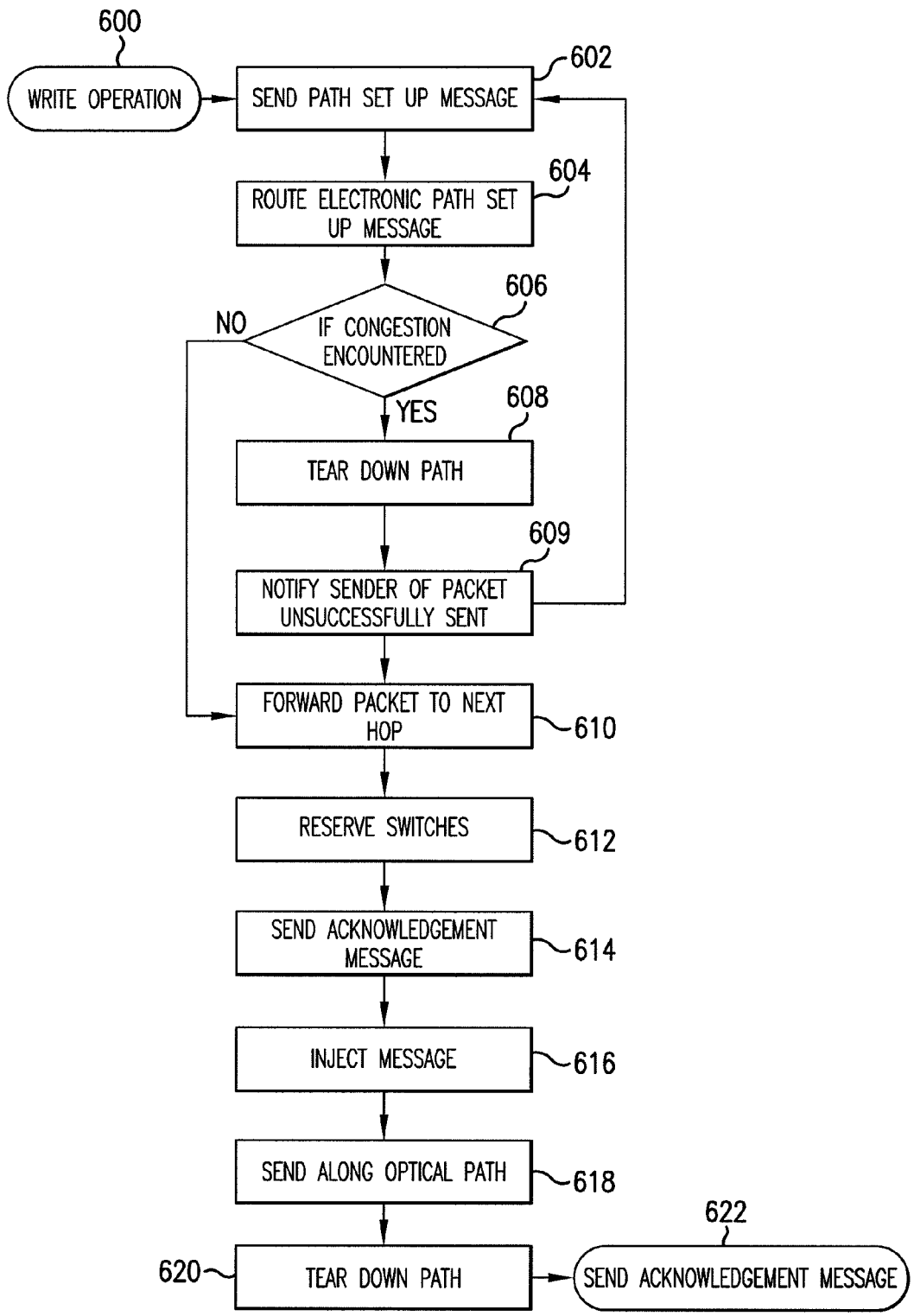
FIG. 6 depicts an exemplary procedure according to an embodiment of the described subject matter.

FIG. 6 illustrates an exemplary operation of the NoC in the transmission of a message between two terminals. In this example, a write operation takes place from a processor in node A to a memory address located at node B (block 600). Both can be arbitrary nodes connected through the photonic NoC. When the write address is known, possibly even before the contents of the message are ready, a path setup packet is sent on the electronic control network (block 602). The packet includes information on the destination address of node B, and perhaps additional control information such as priority, flow id, or other information. The control packet is routed in the electronic network (block 604), reserving the photonic switches along the path for the photonic message (block 612) which will follow it. At each router in the path, a next-hop decision is made according to the routing algorithm used in the network (block 610). Once the packet reaches its destination, an acknowledgment light-pulse (e.g., acknowledgment message) is sent back (block 614) to notify the sender that the optical message can be sent. The optical message is injected into the optical network (block 616) and sent along the reserved path to the destination (block 618). After the message transmission is completed a path-teardown packet is finally sent to release the path for usage by other messages (block 620). Once the photonic message has been received and checked for errors, a small acknowledgement packet can be sent on the electronic control network, for example, to support guaranteed-delivery protocols (block 622). It should be noted that acknowledgment messages can be sent in any appropriate medium and appropriate form, for example, on the electronic network or on the photonic network or as a simple pulse or as a message packet with appropriate headers.

In the case where a path setup packet is dropped in the router due to congestion (block 606), the path is torn down (block 608), for example, by sending a path-blocked packet in the reverse direction, backtracking the path traveled by the path setup packet. The electronic routers release the reserved switches and notify the node attempting transmission that its request was not served (block 609). The sender then resends the electronic path setup message, possibly through another link (block 602).

Figure 15A:
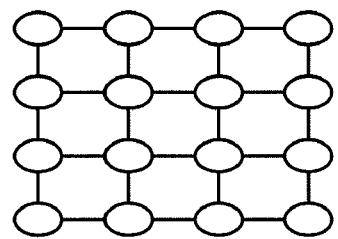
FIGS. 15*a*-15*c* depict exemplary network configurations of the described subject matter.
Figure 15B:
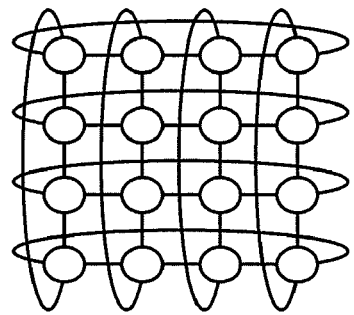
Figure 15C:
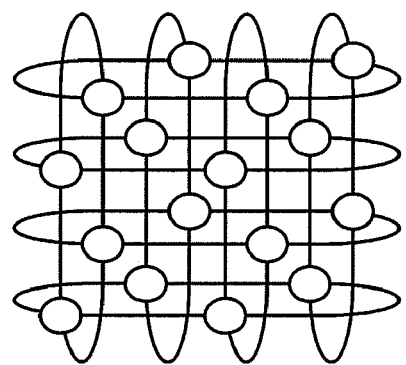

The structure of the interconnected optical switches lends itself conveniently to the construction of planar 2-D topologies such as a mesh, torus, etc. (See FIGS. 15*a*-15*c*). FIG. 15*a* depicts an exemplary 2-d-planar network. FIG. 15*b* depicts an exemplary mesh network. FIG. 15*c* depicts an exemplary torus network. In some embodiments, additional optical links can be used to increase throughput in the photonic network.

High speed optical modulators, adapted for performing switching operations, have been constructed using these ring resonator structures or the free carrier plasma dispersion effect in Mach-Zhender geometries. FIG. 1 depicts an exemplary silicon ring resonator. On the receiver side, SiGe-based photodetectors and optical receivers are used.

One feature of photonic paths is known as bit-rate transparency. Unlike routers based on CMOS technology that switches with each bit of the transmitted data, leading to a dynamic power dissipation that scales with the bit rate, photonic switches can be switched on and off once per message. Their energy dissipation is independent of the bit rate. This property facilitates the transmission of very high bandwidth messages while avoiding the power cost that is typically associated with transmission in traditional electronic networks. Another feature of optical communications is that, at the chip scale, the power dissipated on a photonic link is largely independent of the transmission distance. Energy dissipation remains essentially the same whether a message travels between two cores that are 2 mm or 2 cm apart. Finally, low loss off-chip interconnects such as optical fibers enable the seamless scaling of the optical communications infrastructure to multi-chip systems.

Returning to the discussion of the exemplary embodiments, the topology of the photonic network is a two-dimensional, regular structure, such as a mesh, torus, or variants thereof (see FIGS. 15*a*-15*c*). Such a structure is well suited to CMPs in which the multiple cores are tiled in a regular, planar pattern. In addition, unlike custom topologies that are common in embedded systems, the regular topology (mesh, torus, etc.) can support varying data traffic patterns. This is important because a CMP can execute different workloads leading to generation of different traffic patterns. Alternative network topologies are also contemplated, such as a three-dimensional torus, partially connected mesh, tree, combinations of the foregoing, etc. Two-dimensional, electronic mesh/torus NoCs can use 5×5 switches, where one port is dedicated for local injection and ejection of packets. For ease of illustration and cost benefit in the optical domain, injection and ejection of packets in the exemplary embodiments is facilitated through one of the 4 existing ports of the PSE, blocking it for through traffic.

Figure 4:
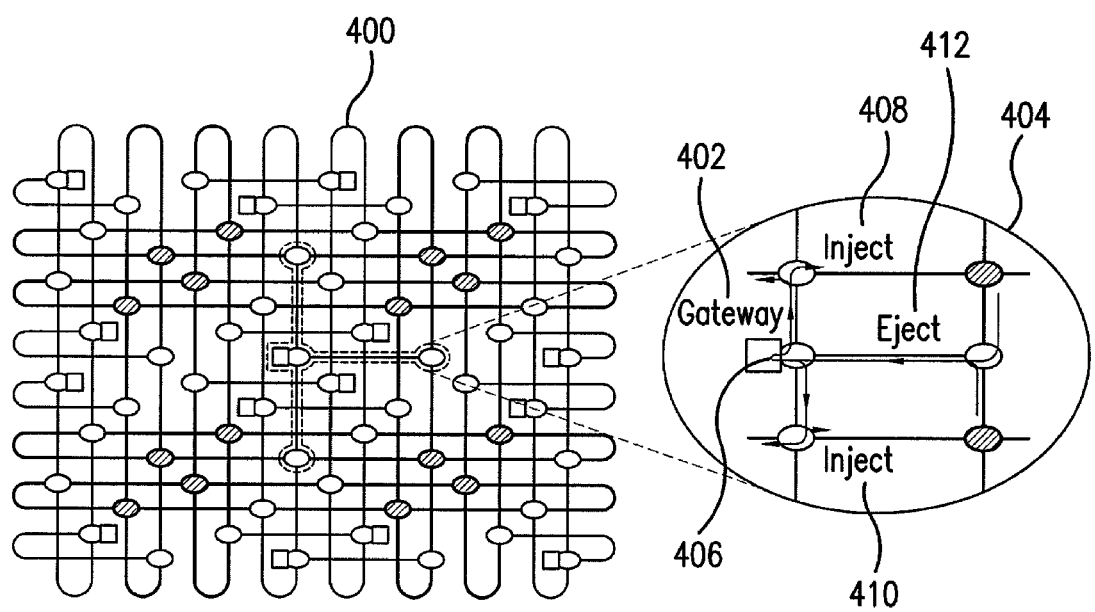
FIG. 4 depicts an exemplary 4-ary 2-D folded torus network (thick lines and dark ovals), exemplary access points (thin lines and light ovals), and 16 exemplary gateways (rectangles) of the described subject matter. One exemplary access point is shaded and enlarged.

FIG. 4 depicts an exemplary network layout. The network 400 is arranged in a folded torus topology with augmented access points for the gateways (see gateway 402 and access point 404). The access points for the gateways (1) facilitate injection and ejection without interfering with the through traffic on the torus, and (2) avoid blocking between injected and ejected traffic which can be caused by the switches' internal blocking. Injection-ejection blocking can be detrimental to the performance and can also cause deadlocks. The access point 404 is designed such that gateway 402 (i.e., the optical transmitters and receivers) are directly connected to a 4×4 switch (the gateway switch), through its West port 406. The gateways can all be connected to the same port in their respective switches.

Figure 5:
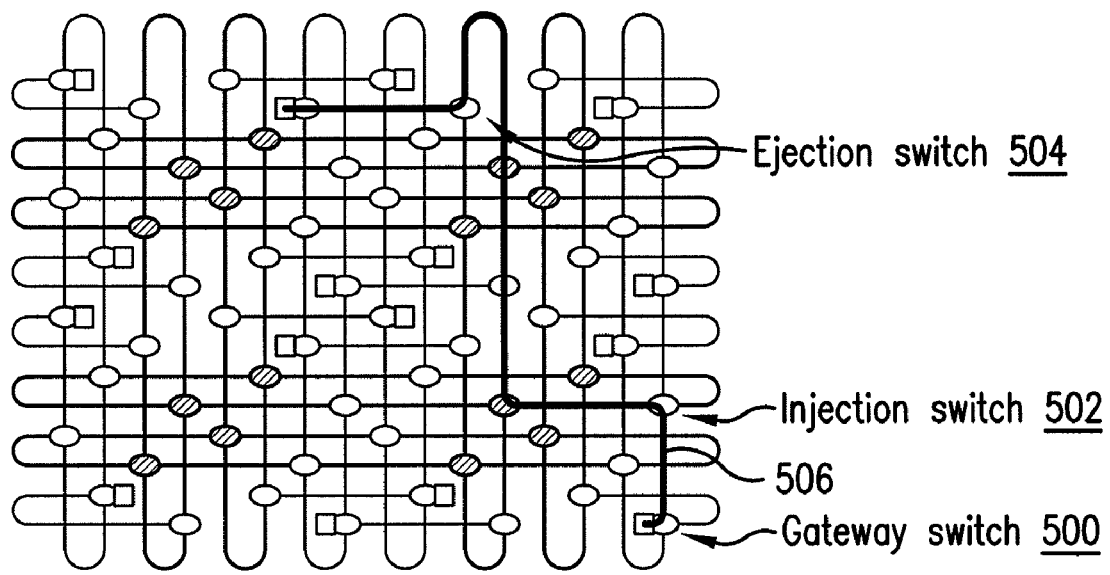
FIG. 5 depicts an exemplary deadlock-avoiding path on an exemplary augmented folded torus network of the described subject matter.

To avoid internal blocking, a set of injection-ejection rules is specified: injected messages make a turn at the gateway switch, according to their destination, and then enter the torus network through an injection switch. The injection pathways are shown in 408 and 410. Messages are ejected from the torus network when they arrive at the ejection switch associated with their final destination. The ejection switches are located on the network, on the same row as the gateway switch. The ejecting messages make a turn here. Finally, the ejected messages pass through the gateway switch without making turns. The ejection path is shown in 412. Another example of a path with the exemplary switches is illustrated in FIG. 5. 500 represents a gateway switch. 502 represents an injection switch. 504 represents an ejection switch. 506 represents the light path of data through the network. Packets are injected at any point of the gateway switch, as long as the structure of the access point is rotated accordingly, because torus networks are edge symmetric.

The design of the access points requires more switches in the network, as every access point requires 3 additional switches. However, each switch has a small footprint and power dissipation, thus making the overall penalty minimal compared to the global power savings enabled by the photonic design. The three additional switches in this embodiment are: (1) a gateway switch that is directly connected to the gateway in the processor core; (2) injection switches, located on the torus rows; and (3) ejection switches, located on the torus columns. Each injected message travels from the gateway switch to an injection switch. It then travels on the network to the ejection switch associated with its destination core, from which it is sent to the gateway switch and out of the network.

Figure 7A:
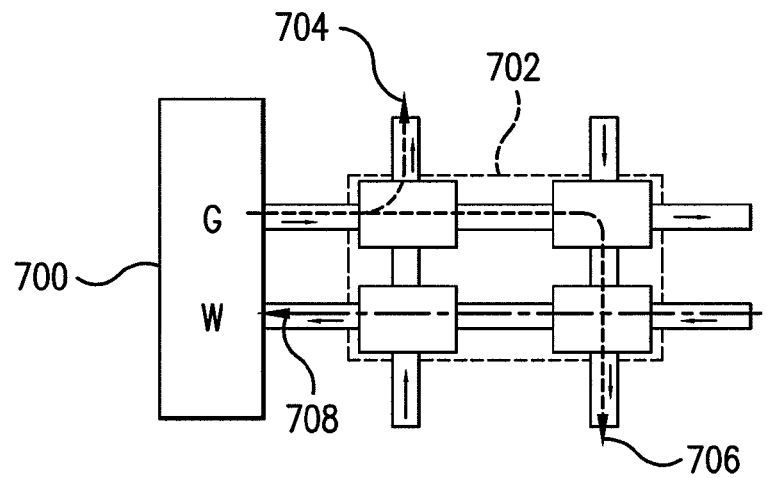
FIG. 7 depicts exemplary gateway (a), injection (b), and ejection (c) switches of the described subject matter, marking message paths to demonstrate that blocking interactions are avoided.

FIG. 7*a* depicts an exemplary gateway switch 702. Injection paths 704 and 706 and ejection path 708 are shown. Injected messages are required to make a turn towards the injection switches. Ejected messages arrive from the ejection switch and pass straight through. Therefore, blocking is avoided.

Figure 7B:
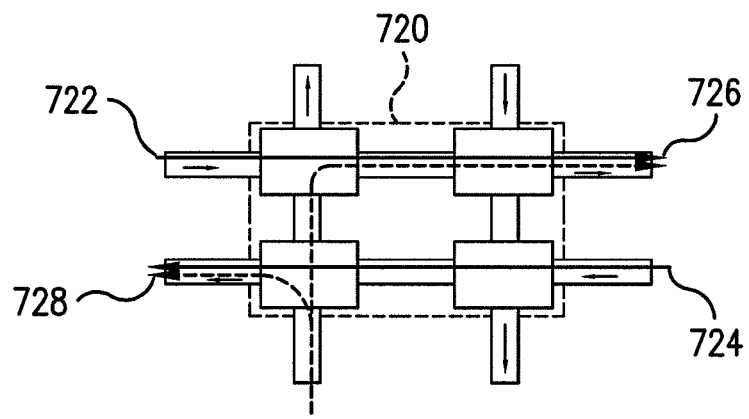

FIG. 7b depicts an exemplary injection switch 720. Paths 722-728 are shown. Messages already traveling on the torus network (722 and 724) do not turn to the injection paths, and consequently, blocking interactions (e.g., as described in Table 1) are avoided between these messages and the injected messages.

Figure 7C:
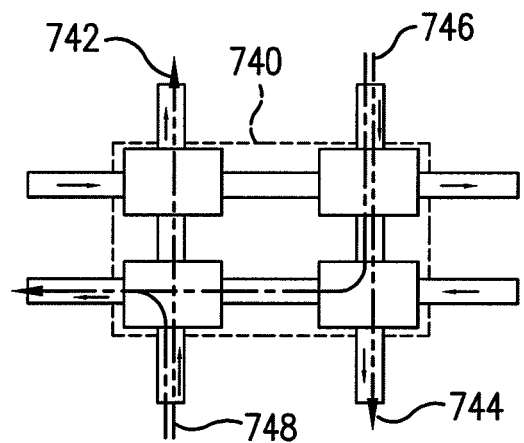

FIG. 7c depicts an exemplary ejection switch 740, including paths 742-748. Messages can arrive from the torus network. These messages turn for ejection (e.g., 746 and 748) or continue straight through (e.g., 742 and 744). Since no messages arrive from the gateway switch, none of the blocking interactions listed in Table 1 can happen.

In some embodiments, improving the performance is accomplished by increasing path diversity. Whenever the path setup packet faces contention, it can be buffered in the electronic router until the blocking is cleared. Such an arrangement slows down the throughput of the torus network. The photonic network can be augmented with additional paths, without changing the number of access points by adding additional optical switches and corresponding links, so that the probability of blocking is lowered and the path setup latency is, accordingly, reduced. Owing to the small footprint of the switches, the simplicity of the routers, and the fact that the PSEs only consume power when they cause messages to turn, the power and area cost of adding parallel paths is minimal.

To route electronic setup messages, any appropriate routing algorithm can be used, for example, dimension order routing. Dimension order routing is well suited for mesh and torus networks. It requires little logic in the routers and, being an "oblivious" algorithm, it does not require the routers to maintain a state or exchange additional information. The exemplary network employs XY dimension order routing, with a slight modification required to accommodate the injection/ejection rules described above. Generally, in XY dimension order routing, the X and Y dimensions are ordered, and messages are routed completely in a higher ordered dimension before being routed in a lower ordered dimension. In this way, deadlock is avoided.

In another embodiment, deflection routing is used. In deflection routing, when contention is encountered, the packet is sent to a "less desirable" port. This routing scheme capitalizes on the large throughput of the optical path when it is set up; the data speed is high enough to compensate for the longer route through the network.

Each message is encoded with 3 addresses: 2 intermediate addresses and a final address, encapsulated within one another. The first intermediate address directs the message to the injection switch on the torus network, thus causing the message to make the turn at the gateway switch, as required by the injection rules (see FIG. 5). The message is then routed on the torus, using plain XY dimension order routing, to the second intermediate address, the ejection switch (in the final destinations row, but one column away from it). Only then the final address is decapsulated and the message is forwarded to the destination gateway, where it arrives without having to turn, according to the ejection rules. The address encapsulation mechanism relieves the routers from processing system-scale considerations when setting up a path and preserves the simplicity of dimension order routing in the torus network.

In some embodiments, where the torus network is path-multiplied, (e.g., where more than one parallel lane exists in one or more of the row/columns), the address encapsulation mechanism can be used to take advantage of the path diversity while preserving the simplicity and obliviousness of dimension order routing. The encoding of the intermediate addresses can be done with the goal of balancing the load between parallel lanes, thus reducing the contention. According to this technique, the injection gateway encodes the first intermediate address, selecting the address according to the desired, parallel torus network. The gateway likewise selects the corresponding ejection address for the selected network. The data is forwarded to the appropriate lane and injected into the appropriate network. In one embodiment, the selection of intermediate addresses is equivalent to choosing, at random, one among several torus sub-networks, thus balancing the load among them. In other embodiments, selection of the network can be done according to other algorithms, such as a round robin, lowest-average-latency algorithm, etc. In another embodiment, a subset of the core processors can share a photonic network. The network can be chosen based on the subgroup network corresponding to the destination or source address. In another embodiment, networks can be selected based on the priority level of the traffic, type of traffic, or designated flow of traffic.

The communications infrastructure also includes Electronic/Optical and Optical/Electronic (E/O and O/E) interfaces, which are used for the exchange of photonic messages to and from the network. In some embodiments, these interfaces include small footprint microring-resonator-based silicon optical modulators, Mach-Zhender silicon modulators, and SiGe photodetectors. In some embodiments, the laser sources, as in many off-chip optical communication devices, can be located off-chip and coupled into the chip using optical fibers. The network gateways can also include clock synchronization and recovery circuits and serialization/deserialization devices, although these devices can be avoided in an intra-chip system, to save power. Throughput can be increased in these interfaces by implementing optical time division multiplexing (OTDM) or wavelength division multiplexing (WDM) algorithms or any other suitable algorithm.

The foregoing architecture can support the exchange of very short to very long messages in an efficient manner. The latency required to set up an optical path and high throughput of the optical network is well suited to exchange of long messages, such as DMA transactions. Short data segments, such as those exchanged during cryptographic operations, memory read requests, or cache-coherency snoop messages can be exchanged on the electronic network due to the latency involved in setting up an optical path. To exchange frequent, short messages between two cores, a persistent optical path can be maintained.

Several further examples assist in illustrating the power of the described subject matter. An event-driven environment was developed that provides support for modular structures, message-based communications between modules, and modeling of physical layer factors such as delay, bandwidth and error rate.

The exemplary network is a 36-core chip multiprocessor, organized in a 6×6 planar layout, and built in a 22 nm CMOS process technology. The chip size is assumed to be 20 mm along its edge, so each core is 3.3 mm×3.3 mm in size. The network is a 6×6 folded-torus network augmented with 36 gateway access points similar to that shown in FIG. 4. The simulation network includes 144 switches, organized in a 12×12 structure. The electronic routers, each located at the center of a switch, are spaced apart by 1.67 mm and the PSEs (576 are used) are spaced apart by 0.83 mm.

The area and spacing considerations dictate the timing parameters of the network. A propagation velocity of 15.4 ps/mm in a silicon waveguide is assumed for the photonic signals and a propagation velocity of 131 ps/mm in an optimally repeated wire at 22 nm is assumed for the electronic signals traveling between electronic routers. The inter-PSE delay and inter-router delay are, therefore, 13 ps and 220 ps, respectively. The PSE setup time is assumed to be 1 ns and the router processing latency is 600 ps, or 3 cycles of a 5 GHz clock.

Message injection processes in NoC simulation models are often Bernoulli or modulated-Bernoulli processes, which work well with packet-switched slotted networks. Since the architecture resembles circuit-switching, the inter-message gap is modeled as an exponential random variable with a parameter $\mu_{IMG}$. Uniform traffic is used. This traffic pattern, which is simplified for the sake of illustration, serves to illustrate the described subject matter.

An optimal message size is calculated. The overhead ratio is defined as:

$$\rho = \frac{T_{path\text{-}reservation}}{T_{message\text{-}duration}} \quad (1)$$

where $T_{path\text{-}reservation}$ is the time between the transmission of the path setup packet and the transmission of the path-teardown packet, and $T_{message\text{-}duration}$ is the time during which actual transmission takes place, corresponding to the size of the message.

Figure 8:
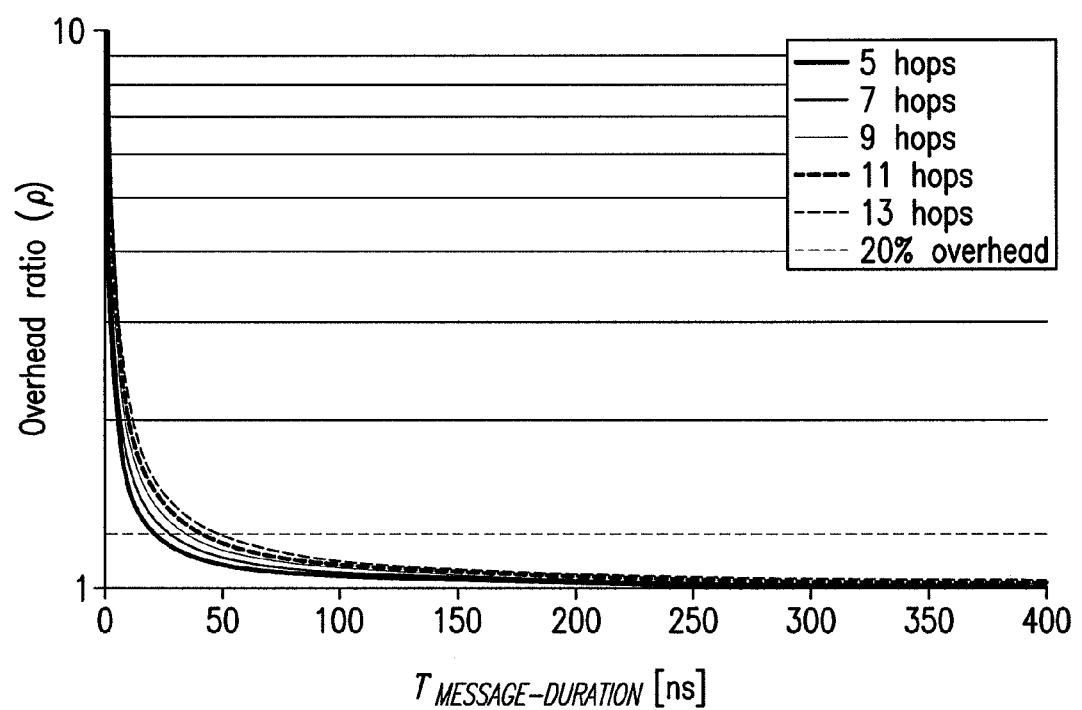
FIG. 8 depicts exemplary data showing an overhead ratio as a function of path-length and message duration in an exemplary, unloaded 12×12 torus network of the described subject matter.

The optimal message size for this example is the smallest size which does not exceed a certain overhead ratio. The smaller the value of ρ, the higher the network efficiency. The maximum allowed overhead is set to 20%. The maximum allowed overhead ratio is, therefore, ρ=1.25. FIG. 8 depicts a graph that plots ρ as a function of the path length and $T_{message\text{-}duration}$, for a completely unloaded network. Where the 20% overhead line appears as a dashed line, the limit is met by messages with a duration larger than 50 ns, for the longest path (13 hops). Therefore, a message size of 50 ns is used. The amount of data that can be transmitted in 50 ns can be more than 2 KBytes, supporting the exchange of full memory pages or large DMA transactions. A message size of 4 k-16 k provides good performance for this exemplary network.

It is expected that the overhead will be larger when the network becomes loaded with traffic from other nodes, as path acquisition is expected to take longer due to blocking. To evaluate the effect of congestion on the message setup overhead 50-ns messages, from all nodes, with uniformly distributed addresses are transmitted. The load on the network is managed by controlling the distribution parameter of the exponentially distributed inter-message gap ($\mu_{IMG}$). The load offered (α) to the network is then given as:

$$\alpha = \frac{T_{message\text{-}duration}}{T_{message\text{-}duration} + \frac{1}{\mu_{IMG}}} \quad (2)$$

Figure 9:
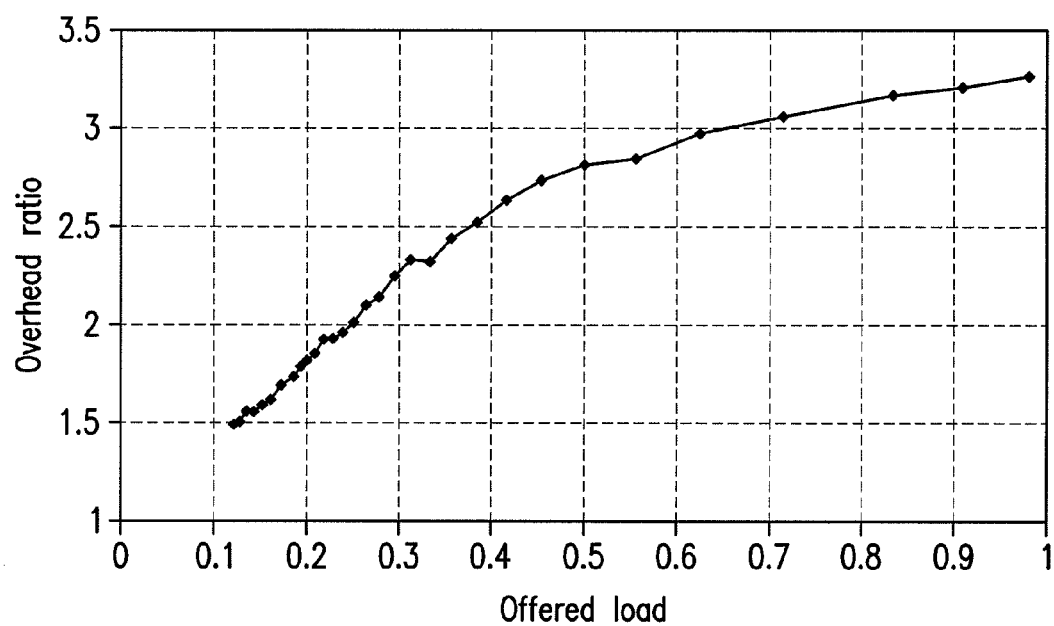
FIG. 9 depicts exemplary data showing an overhead ratio for different path-lengths in an exemplary, unloaded network of the described subject matter.

At the limit of constant transmission by all sources ($1/\mu_{IMG} \to 0$) the offered load approaches 1, and when the inter-message gap is very large ($1/\mu_{IMG} \to \infty$) the offered load approaches zero. FIG. 9 depicts the congestion data.

FIG. 9 reveals that the overhead in a loaded network, even lightly loaded, is larger. The overhead ratio rises quickly to a value of 3 (or a path setup latency of 100 ns) for loads exceeding a 0.6 value. Adaptive routing algorithms, which use information about the availability of adjacent paths when making a routing decision, can be used to locate alternative paths for messages and reduce the blocking probability. Another technique is to increase the path diversity by augmenting the network with parallel lines.

In another illustrative example, the topology chosen for the proposed network, a torus, can be easily augmented with additional parallel paths that provide path-diversity and facilitate this distribution of the load. The performance metric used to evaluate the improvement gained by adding the paths is again the path setup overhead ratio, which is derived from the path setup latency. As in the previous example, the $T_{message\text{-}duration}$ is set at 50 ns. $T_{IMG}$ is exponentially distributed with a parameter $\mu_{IMG}$ which is, again, varied to control the offered load. Network with path diversity values of 1-4 are analyzed, where a value of 1 represents the baseline 6×6 torus with 36 access points and a value of 4 represents a 24×24 torus, also with 36 access points. Increasing path diversity incurs overhead in hardware and increased zero-load latency as a result of the larger network diameter. Table 2 lists the numbers of switches required to implement each of these networks. If we assume that the area of the 4×4 switch is about 5000 mm² then, theoretically, more than 80000 such switches can be integrated in the photonic layer of a 400 mm² die. The power dissipated by the diversified network scales sub-linearly with the number of switches because switches largely do not consume power when a message is not being redirected. The number of turns can be fixed and can be independent of the number of switches, thereby setting an upper bound limit on the power expended in forwarding the photonic message regardless of the actual physical distance traveled.

TABLE 2

Switch counts for networks with different path-diversity values

| PD value | Network | Gateway | Injection | Ejection | TOTAL |
|---|---|---|---|---|---|
| 1 | 36 | 36 | 36 | 36 | 144 |
| 2 | 144 | 36 | 72 | 72 | 324 |
| 3 | 324 | 36 | 108 | 108 | 576 |
| 4 | 576 | 36 | 144 | 144 | 900 |

Figure 10:
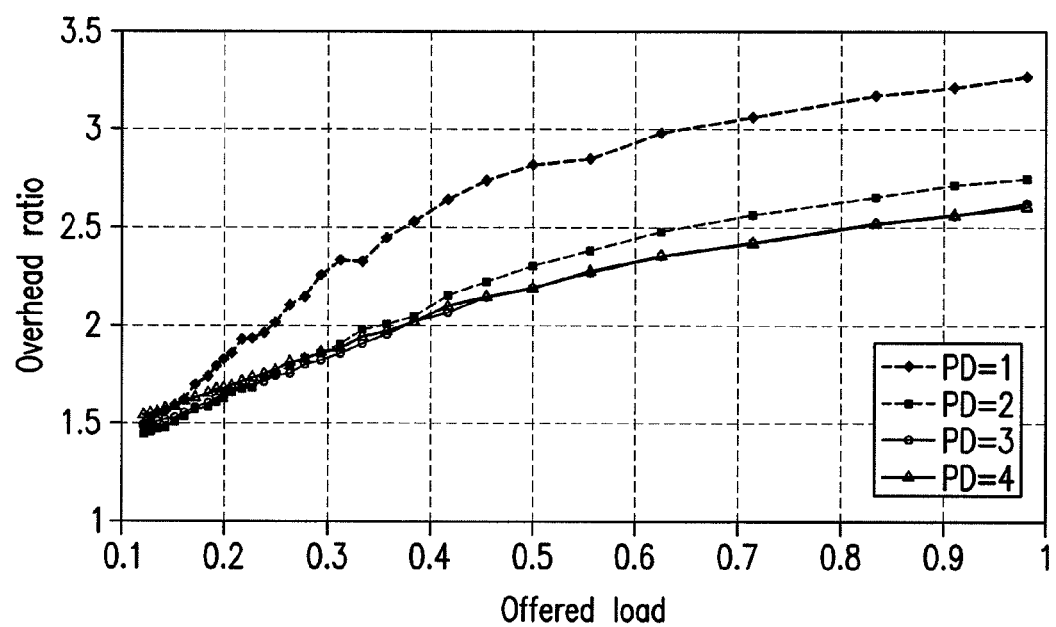
FIG. 10 depicts exemplary data showing an overhead ratio vs. offered load for an exemplary, 12×12 torus network of the described subject matter with 36 gateway access points (324 switches).

Turning to FIG. 10, the increased network diameter caused by the provisioning of paths actually increases the latency when the network is lightly loaded and blocking is not frequent. As the network becomes congested, message blocking starts to dominate the path setup latency. The additional paths, which reduce blocking, also reduce the latency and create a more efficient network. A path-diversity of three performs well for this exemplary network.

Figure 11:
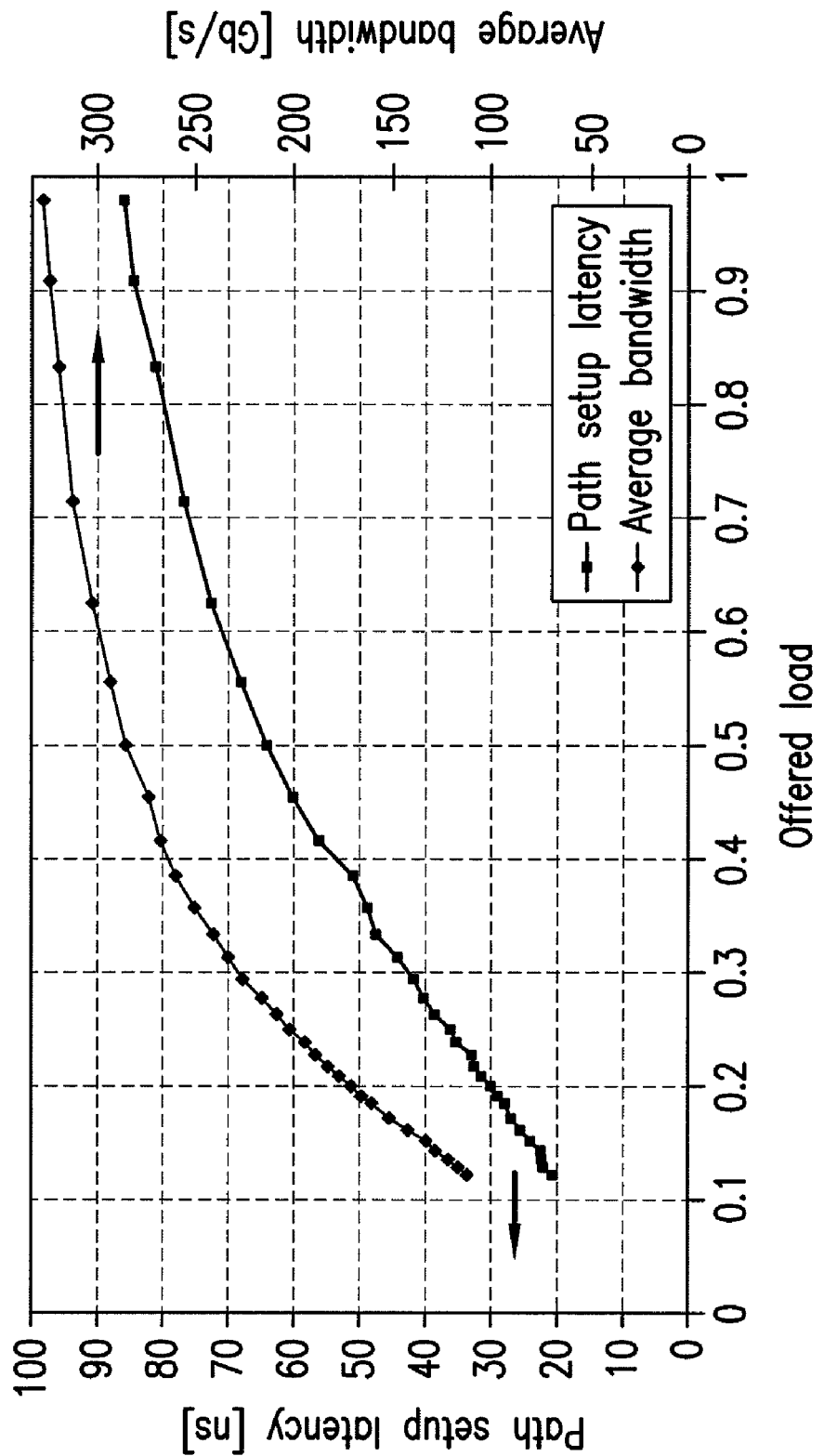
FIG. 11 depicts exemplary data showing latency and average bandwidth vs. offered load for an exemplary, 12×12 torus network of the described subject matter with 36 gateway access points (324 switches).

FIG. 11 shows the path setup latency and the average bandwidth available per port for a network with a path diversity value of 2 as a function of the offered load, when 50-ns messages are injected, assuming a peak bandwidth of 960 Gb/s using OTDM and WDM. It can be observed that even under low loads and relatively low average latencies of 30 ns an average bandwidth of 230 Gb/s can be provided to each core, while using simple routing algorithms and circuit-setup methods. The bisection bandwidth corresponding to this operating point is 2.07 Tb/s.

Figure 13:
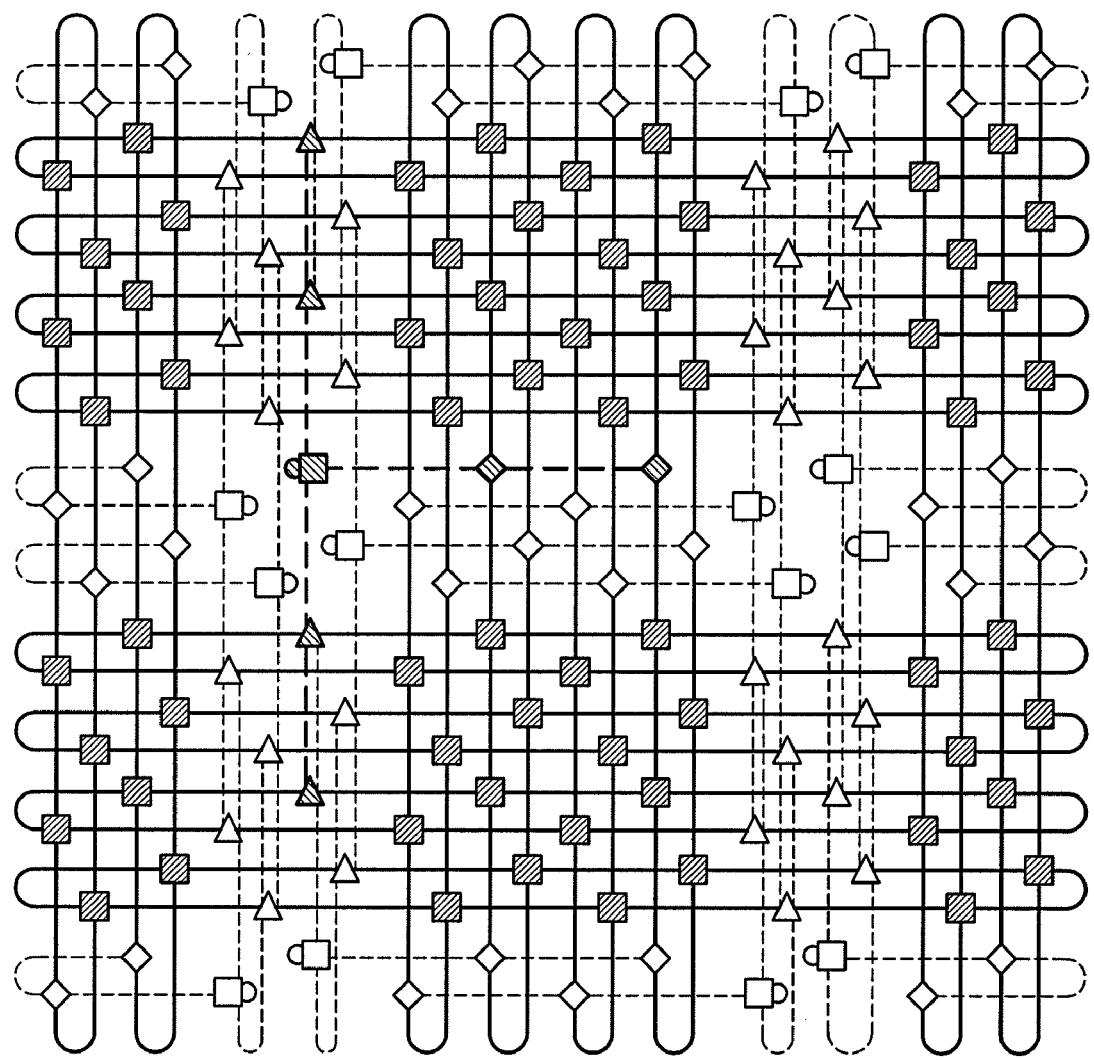
FIG. 13 depicts an exemplary layout of a 16-node 2-D folded torus of the described subject matter with 2-path over-provisioning. Solid lines represent bi-directional links Dashed lines represent unidirectional links. Network switches (squares) are shown in dark gray. Gateways (circles), gateway switches (squares), injection switches (triangles), and ejection switches (diamonds), appear in light gray.

FIGS. 12 and 13 depict additional exemplary embodiments of the described subject matter.

FIG. 12 includes an exemplary non-blocking switch including inputs 1220, 1224, 1228, and 1232 and outputs 1222, 1226, 1230, and 1234. Waveguides 1238-1242 connect certain inputs to certain outputs and ring resonators 1244-1258 are present to direct light in a non-blocking configuration.

FIG. 13 depicts an exemplary 36-node (6×6) implementation of a 2-D folded torus with 2-path over-provisioning. The path over-provisioning allows 4 injection and 2 ejection switches to be reached by each gateway, as opposed to 2 injection and 1 ejection switches without over-provisioning. Further, each injection switch is shared by two gateways. This decreases the probability that a gateway will be denied transmission due to traffic on the network.

The designs of the injection and ejection switches can be simplified (e.g., certain waveguides and microrings can be eliminated), resulting in reduced optical losses and lower switch footprints, for example, injection switch 1202 and ejection switch 1204 of FIG. 12, respectively. Then, the losses encountered in each photonic component can be accrued across the longest path of the network (gateway switch to gateway switch). 0.05 dB and 0.5 dB of loss for every waveguide crossing and microring-utilizing turn are assumed, respectively. The routing switch, for example, has an average loss of 0.5 dB, with a maximum loss of 0.7 dB, depending on the specific input and output ports utilized. The average loss through the injection switch is determined to be 0.36 dB, with a maximum loss of 0.55 dB (in the case of an injection into the network). Lastly, the average loss through the ejection switch is 0.25 dB, with a maximum of 0.55 dB. Additionally, the longest path through the network consists of 11 routing switches (10 of which require the maximum loss value), 3 injection and ejection switches each (injected/ejected once, and encountered twice each within the network), 23 uni-directional link crossings, and 36 bi-directional link crossings, which constitutes 13.7 dB of optical loss.

This falls within the optical loss budget offered by current optical transceivers used in high-density interconnects, including those which utilize off-chip laser sources, as the distributed-feedback (DFB) lasers can provide output power more than 20 dB above the sensitivities of current silicon optical receivers. This signifies the practicality of the hybrid approach. These assumed loss values reflect improvements in currently reported devices, for which the insertion losses are not fundamentally limited; the loss values are contemplated to be obtainable due to the rapid advancement of photonic integration. Further, given the small footprint of the injection (315 nm×315 nm), ejection (260 nm×210 nm), and routing switches (525 nm×525 nm), the total area consumed by the photonic switches can be less than 1.47 nm² per node using a 1.6 nm wavelength grid; in addition, more area can be gained by using larger wavelength spacing.

In some embodiments, for a given source-destination pair, the setup latency can be expressed as $D=(H-1)\cdot t_p+t_q$, where H is the number of hops in the packet's path, $t_p$ is the processing latency in each router and $t_q$ is the total additional latency due to contentions. Contentions in the path setup phase are handled by queuing the path setup packet until the message blocking its path is torn down and the path is cleared. It has been shown that $t_q$ is a contributor to the overall setup latency, especially when the network is heavily loaded.

Figure 14A:
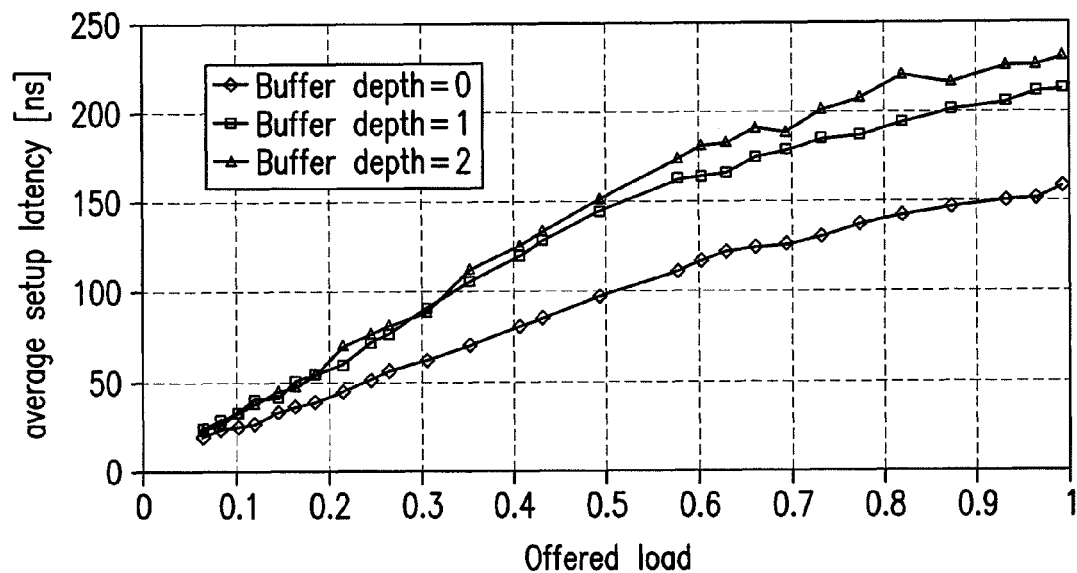
FIGS. 14*a* and 14*b* depict exemplary data showing an average path setup latency (14*a*) and bandwidth (14*b*) as a function of buffer depth in an exemplary, 6×6 photonic NoC of the described subject matter.
Figure 14B:
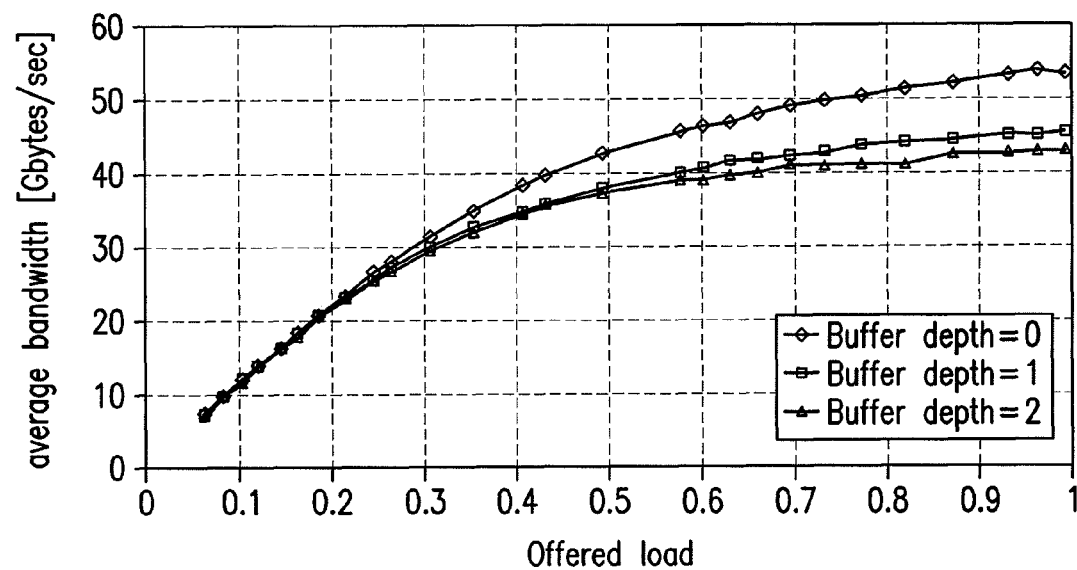

In another exemplary embodiment, a 36-core system with a photonic NoC and a path-multiplicity factor of ×2 is constructed. The latency components in POINTS are based on predicted individual latencies of electronic and silicon-photonic components in a future 22 nm process, and the optical message size is 16 KBytes. FIGS. 14a and 14b show that by setting the buffer depth to 0, i.e., by dropping every blocked packet and immediately notifying the sender, the path setup latency can be reduced by as much as 30% as compared to the case where path setup packets are not dropped on contention (buffer depth of 2). When a buffer depth of 1 is simulated, i.e., when a single path setup packet can be queued in each direction in each electronic router, the latency reduction is smaller. Buffer depths of one and two, however, are contemplated by the described subject matter and can have other desirable characteristics. It should be understood that other contention resolution techniques are contemplated, for example, (a) large buffers (3 or more packets) in the routers in which pass-setup packets are blocked upon contention, (b) dropping packets after some timeout, to cause old packets to be rerouted, or (c) dropping packets upon contention, thus causing the source to immediately attempt a different path.

The peak bandwidth per port in the above example, using WDM and OTDM, is set at 960 Gb/s. The average bandwidth is calculated as the product of the peak bandwidth and the fractional time, in steady state, that can be allocated for actual transmission of the optical messages, after messages have been set up. The average bandwidth results are also shown in FIGS. 14a and 14b.

The exemplary embodiment shown in routing switch 1200 of FIG. 12 is a non-blocking optical switch. The routing switch 1200 increases the number of internal paths within the switch to alleviate message blocking. When compared to the blocking switch in FIG. 3, it can be seen that in the non-blocking switch (FIG. 12) no paths are shared between messages, and therefore messages cannot block each other by competing for shared paths. As compared to the example in connection with FIG. 3, when the same message pattern is routed in the nonblocking switch (South(1232)□East(1230) and West(1220)□South(1234)). The nonblocking switch is designed such that the south-to-east message passes through 1232, 1244, 1242, 1252, 1252, 1230 and the west-to-south message passes through 1220, 1246, 1234. No resources (rings or waveguides) are shared and messages do not block each other. This property holds for all the blocking interactions discussed in Table 1. The number of microrings remains the same and maintains low power requirements. The switch guarantees an internal path from any input to any output, as long as no two packets contend for the same output and packets are not allowed to ingress and egress from the same port (no U-turn). Owing to the small footprint of the PSEs and the simplicity of the electronic router, the new routing switch can still occupy a very small area. There is a trade-off between the footprint of a microring and the wavelength spacing of the optical signal, which corresponds to the free spectral range of the resonator. The microring diameter is approximately inversely proportional to the wavelength spacing. Based on the size of the microring resonator, devices having 1.6-nm wavelength spacing and the logic to implement the electronic router, the total area of the non-blocking routing switch is estimated to be 525 μm×525 μm.

In some embodiments, the data communications infrastructure of the described subject matter is adapted for general on-chip communication. For example, the data communications infrastructure can be used to transmit data to and from multiple memory components, co-processors, audio/video processing components, combinations of the foregoing, etc.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within the spirit and scope thereof.

The invention claimed is:

1. A system for on-chip data communication adapted for communicating between a source and a destination, comprising:
   a network of one or more interconnected optical switches adapted for delivering data from the source to the destination, each optical switch including:
   at least one photonic switching element, the at least one photonic switching element adapted to direct optical data through the optical switch when activated, and
   an electronic router in connection with the at least one photonic switching element, the electronic router adapted for routing electronic path setup messages from a source to a destination and for activating the at least one photonic switching element.

2. The system of claim 1, wherein the source and destination are core processors on a multicore processor chip.

3. The system of claim 1, wherein the optical switch includes four photonic switching elements arranged in a 2×2 structure.

4. The system of claim 3, wherein the at least one photonic switching element includes 2 input and 2 output ports.

5. The system of claim 1, wherein the photonic switching element includes at least one electrically activated ring resonator.

6. The system of claim 1, wherein the optical network is arranged in a folded torus topology.

7. A method for on-chip communication, comprising:
   converting electronic data into optical data;
   determining an optical data communication path by routing an electronic path setup message through one or more optical switches;
   at the one or more optical switches, activating a photonic switching component, the photonic switching component directing the optical data along the optical data communication path;
   sending the optical data along the optical data communication path; and
   converting the optical data into electronic data.

8. The system of claim 1, wherein the on-chip communication is between core processors in a multicore processor architecture.

9. The system of claim 8, wherein the optical switch includes four photonic switching elements.

10. The system of claim 8, wherein the at least one photonic switching element includes 2 input and 2 output ports.

11. The system of claim 8, wherein the photonic switching element includes at least one electrically activated ring resonator.

12. The system of claim 8, wherein the optical network is arranged in a folded torus topology.

13. A system for on-chip data communication between a source and a destination, comprising:
   a network of interconnected optical switch components adapted for delivering data from the source to the destination; and
   a network of interconnected electrical routers arranged in the same topology as the network of optical switches, each of the electrical routers in connection with at least one optical switching component, adapted for routing an electronic path setup message from a source to a destination, and adapted for configuring the optical switching components to direct optical data along an optical data communications path.

* * * * *